(12) United States Patent
Raden et al.

(10) Patent No.: US 9,306,895 B1
(45) Date of Patent: Apr. 5, 2016

(54) PREDICTION OF MESSAGE DELIVERABILITY EVENTS

(71) Applicant: Amazon Technologies, Inc., Seattle, WA (US)

(72) Inventors: Gary Paolo Raden, Seattle, WA (US); Nikolay Georgiev Hristov, Seattle, WA (US); Soonhan Mahae Koh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 295 days.

(21) Appl. No.: 14/020,168

(22) Filed: Sep. 6, 2013

(51) Int. Cl.
*G06F 15/16* (2006.01)
*H04L 12/58* (2006.01)

(52) U.S. Cl.
CPC ................ *H04L 51/30* (2013.01); *H04L 12/58* (2013.01); *H04L 12/585* (2013.01)

(58) Field of Classification Search
CPC ........ H04L 12/58; H04L 51/30; H04L 12/585
See application file for complete search history.

(56) References Cited

U.S. PATENT DOCUMENTS

| | | | |
|---|---|---|---|
| 7,206,814 B2 | 4/2007 | Kirsch | |
| 7,487,217 B2 | 2/2009 | Buckingham et al. | |
| 7,756,930 B2 | 7/2010 | Brahms et al. | |
| 7,890,627 B1 | 2/2011 | Thomas | |
| 7,899,866 B1 | 3/2011 | Buckingham et al. | |
| 7,925,516 B2 | 4/2011 | McCann et al. | |
| 8,224,905 B2 | 7/2012 | Bocharov et al. | |
| 8,417,787 B1 * | 4/2013 | Muir | G06Q 10/107 709/206 |
| 8,560,616 B1 | 10/2013 | Diac et al. | |
| 2005/0277418 A1 | 12/2005 | Singhal et al. | |
| 2006/0031359 A1 | 2/2006 | Clegg et al. | |
| 2006/0168057 A1 | 7/2006 | Warren et al. | |
| 2006/0179113 A1 | 8/2006 | Buckingham et al. | |
| 2007/0220008 A1 * | 9/2007 | Mizhar | H04L 67/06 |
| 2008/0208980 A1 | 8/2008 | Champan et al. | |
| 2008/0225888 A1 | 9/2008 | Valluri et al. | |
| 2009/0037469 A1 | 2/2009 | Kirsch | |
| 2009/0300720 A1 | 12/2009 | Guo et al. | |
| 2010/0212011 A1 * | 8/2010 | Rybak | H04L 12/585 726/22 |
| 2010/0229236 A1 * | 9/2010 | Rybak | H04L 12/585 726/22 |
| 2012/0215852 A1 * | 8/2012 | Chen | H04L 51/12 709/206 |
| 2015/0019910 A1 * | 1/2015 | Simon | G06F 11/1402 714/16 |

OTHER PUBLICATIONS

U.S. Appl. No. 12/890,910, filed Sep. 27, 2010, Diac et al .

(Continued)

*Primary Examiner* — Moustafa M Meky
(74) *Attorney, Agent, or Firm* — Lee & Hayes, PLLC (57) ABSTRACT

Technologies are described herein for predicting and resolving message deliverability events. A message deliverability event is an event initiated by a mailbox provider that results in the refusal of the mailbox provider to deliver a message to the inbox of its intended recipient, or that results in a mailbox provider delaying the delivery of a message to the inbox of its intended recipient. The transmission of messages to mailbox providers and responses to the transmission of the messages can be monitored. Based upon the monitoring, a determination can be made as to whether the probability of a future message deliverability event exceeds a threshold with regard to one or mailbox providers. If there the probability of a message deliverability event exceeds the threshold, one or more actions may be taken to reduce the probability that the future message delivery event will occur.

20 Claims, 4 Drawing Sheets

(56) References Cited

OTHER PUBLICATIONS

U.S. Official Action dated Nov. 9, 2012 in U.S. Appl. No. 12/890,910, filed Sep. 27, 2010, First Named Inventor Paul F. Diac.
U.S. Notice of Allowance/Allowability dated Jul. 1, 2013 in U.S. Appl. No. 12/890,910, filed Sep. 27, 2010, First Named Inventor Paul F. Diac.
"Email Service Provider (Marketing)", Wikipedia [online][retrieved on Jul. 15, 2013] retrieved from: http://en.wikipedia.org/wiki/Email_service_provider_(marketing) 2 pps.
"Mailbox Provider", Wikipedia [online][retrieved on Jul. 15, 2013] retrieved from: http://en.wikipedia.org/wiki/Mailbox_provider 3 pps.
U.S. Appl. No. 14/052,955, filed Oct. 14, 2013, Diac et al.
U.S. Notice of Allowance/Allowability dated Jun. 5, 2014 in U.S. Appl. No. 14/052,955, filed Oct. 14, 2013, first named inventor: Paul-Flavian Diac.

\* cited by examiner

PREDICTION OF MESSAGE DELIVERABILITY EVENTS

BACKGROUND

A provider of email services (which may be referred to herein as an "email service provider" or an "ESP") may process email messages on behalf of many customers (which might also be referred to herein as "senders") and forward the messages to specified recipients over the Internet. These email messages may be sent across the Internet through a number of mail servers operating in the ESP's email delivery system, depending on the volume of email messages being processed and the capacity of the mail servers. The mail servers may utilize the domain name system ("DNS") to identify the remote mail system designated for a recipient's email address, and then utilize an email protocol, such as the Simple Mail Transfer Protocol ("SMTP") to forward the email message to the destination mail system. The destination mail system may provide an email inbox to each recipient through which the recipient can retrieve the transmitted email messages. Accordingly, operators of such systems may be referred to herein as "mailbox providers."

In order to protect recipients from unsolicited junk or bulk email (which may be referred to herein as "spam" or "UBE"), mailbox providers commonly incorporate a variety of known anti-spam techniques to identify and mark such emails. Each email message received by a mailbox provider may be identified by both the sender's email address as well as a source address, such as the Internet protocol ("IP") address of the mail server within the ESP's email delivery system from which is was sent. As part of the implemented anti-spam techniques, upon detecting a threshold number of email messages identified as spam email, the remote mail system may begin to mark all email from the sending mail server as spam email based on the IP address from which the email message was transmitted. The mailbox providers might also take other types of action, such as slowing down the delivery of email, in response to detecting a high volume of spam email or customer complaints.

Ultimately, a mailbox provider may begin to block all email messages transmitted from a mail server using a particular IP address. In addition, the mailbox provider may share the IP address of the offending mail server with other remote mail systems through the use of a "blacklist." Consequently, messages transmitted using a blacklisted IP address may be blocked by multiple mailbox providers. This, of course, can be very frustrating for senders of email messages, especially those senders that were not responsible for the blocking of messages by the mailbox providers.

It is with respect to these and other considerations that the disclosure made herein is presented.

DETAILED DESCRIPTION

The following detailed description is directed to technologies for predicting message deliverability events and, potentially, addressing conditions contributing to the probability of such an event before the event occurs. A message deliverability event is an event initiated by a mailbox provider that results in the refusal of the mailbox provider to deliver a message to the inbox of its intended recipient, or that results in a mailbox provider delaying the delivery of a message to the inbox of its intended recipient. Utilizing the technologies described herein, the transmission of messages to mailbox providers and responses to the transmission of such messages can be monitored. Based upon the monitoring, a determination can be made as to whether the probability of a future message deliverability event exceeds a predefined threshold with regard to one or more mailbox providers. If there the probability of a message deliverability event exceeds a certain threshold, one or more actions can then be taken to reduce the probability that the future message delivery event will occur.

According to embodiments, an ESP processes email messages on behalf of senders, and forwards the messages to mailbox providers associated with specified recipients. In order to minimize the chances of one or more of the mailbox providers initiating a message deliverability event with regard to the senders, the ESP monitors the transmission of email messages to mailbox providers and collects message status information regarding the transmission of the email messages over time. For example, and without limitation, the message status information might include return codes provided by the mailbox providers in response to the transmission of email messages, data describing the timing of messages received back from the mailbox providers, the plain text content of messages received from the mailbox providers, and other information.

The ESP might also periodically analyze the collected message status information to determine the probability of the occurrence of a future message deliverability event with regard to one or more of the mailbox providers. For example, and without limitation, the ESP might analyze patterns in the collected message status information to determine the probability of a future message deliverability event with regard to a particular mailbox provider.

If the ESP determines that the computed probability of a future message deliverability event occurring exceeds a ESP-specified threshold, the ESP might also cause one or more actions to be taken to reduce the probability that the predicted deliverability event will occur. For example, and without limitation, the ESP might modify one or more IP addresses and/or domains utilized to send email messages to the mailbox provider. In conjunction therewith, the ESP might also initiate an investigation into the cause, or causes, of the predicted message deliverability event. For example, and without limitation, the ESP might identify one or more email senders that are at least partially responsible for the predicted message deliverability event.

The ESP might also provide suggestions to the identified message senders regarding ways in which the senders may reduce the probability of the occurrence of the predicted message deliverability event. For example, the ESP might suggest changes to the content of the messages transmitted by the senders that may reduce the likelihood that a mailbox provider would classify the messages as UBE. The ESP might also initiate other types of actions to reduce the likelihood of the predicted message deliverability event occurring. In some embodiments, the ESP might also utilize the predicted probability of the future message deliverability event to modify a sender reputation score associated with message senders. The ESP might also utilize this information for other purposes.

It should be appreciated that although the embodiments disclosed herein are primarily described in the context of predicting, and potentially resolving, message deliverability events occurring with regard to email messages, the disclosure presented herein is not limited to use with email messages. Rather, the embodiments disclosed herein might be utilized with virtually any type of electronic message such as, but not limited to, short message service ("SMS") messages, messages sent through social networking services such as, but not limited to, "tweets" transmitted through the TWITTER social messaging service, and other types of messages. The definition of the term "mailbox provider" as utilized herein is intended to encompass the providers of messaging services other than e-mail messaging, such as but not limited to those described above.

It should be appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, cellular telephone devices, electronic-book readers, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Figure 1:
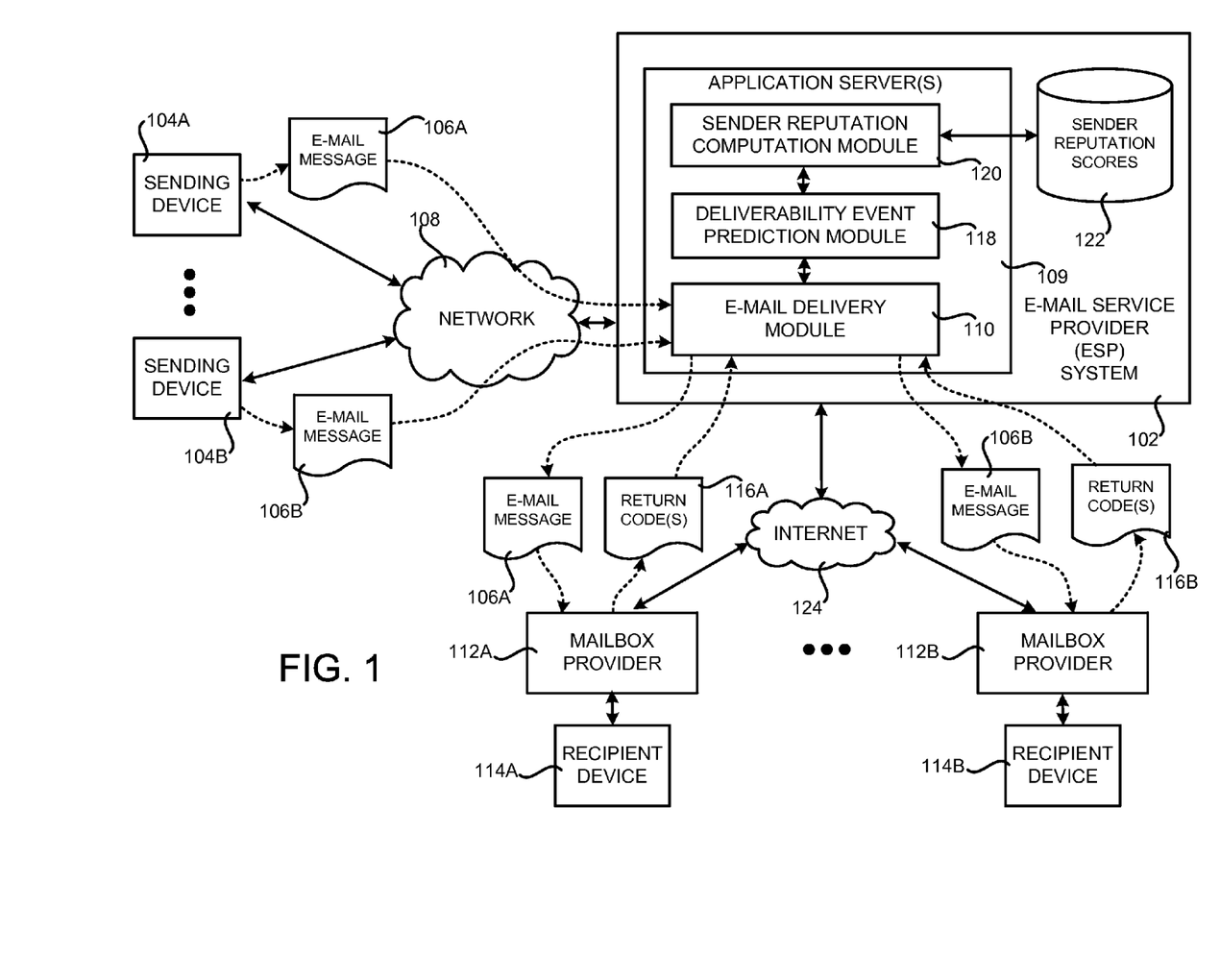
FIG. 1 is a system diagram showing aspects of an illustrative operating environment for predicting and resolving message deliverability events, including several software and hardware components provided by embodiments presented herein.

FIG. 1 and the following description are intended to provide a brief, general description of a suitable computing environment in which the embodiments described herein may be implemented. In particular, FIG. 1 is a system diagram that shows an illustrative operating environment that includes several software components for predicting and, potentially, resolving message deliverability events, according to embodiments provided herein. The environment includes an email service provider ("ESP") system 102. The ESP system 102 may be implemented and maintained by a provider of email services, such as an email service provider. The functionality described herein as being provided by the ESP system 102 might also be provided by other types of systems operated by other types of providers in other implementations.

The ESP system 102 may include a number of application servers 109 that provide various email services to the customers of the ESP system 102. The application servers 109 may execute a number of modules in order to provide the email services to the customers. The modules may execute on a single application server 109 or in parallel across multiple application servers in the ESP system 102. In addition, each module may consist of a number of subcomponents executing on different application servers 109 or other computing devices in the ESP system 102. The modules may be implemented as software, hardware, or any combination of the two.

In one embodiment, an email delivery module 110 executes on the application servers 109. The email delivery module 110 is configured to receive an email message, such as the email message 106A, from a device operated by a sender, such as the sending device 104A, over a network 108, and to deliver the received email message 106A to an intended recipient, or recipients, over the Internet 124. The email message 106A may include a message header containing the information identifying the sender of the email message 106, such as a user identifier ("ID") or sender email address, one or more recipient email addresses, a subject for the message, a unique identifier for the message, and the like. The email message 106A may further include a message body containing the contents of the message. The contents may include text, HTML, XML, or other multi-media content in multipurpose Internet mail extensions ("MIME") attachments, for example. Other sending devices 104B may be utilized to similarly send other email messages 106B using the ESP system 102 in a similar fashion.

The sending devices 104A-104B may be an application server 109 in the ESP system 102, a remote server computer, a personal computer ("PC"), a laptop, tablet device, a notebook computer, a personal digital assistant ("PDA"), a wireless device, a wireless telephone, an electronic-book reader, a game console, a set-top box, a consumer electronics device, or any other computing device capable of connecting to the network 108 and sending email messages. The network 108 may be a local-area network ("LAN"), a wide-area network ("WAN"), the Internet, or any other networking topology known in the art that connects the sending devices 104 to the ESP system 102.

As discussed briefly above, the email delivery module 110 may utilize the DNS system to identify the mailbox provider 112A-112B designated for a recipient's email address, and then utilize an email protocol, such as SMTP, to forward the email message 106 to the destination mailbox provider 112. For instance, in the example shown in FIG. 1, the email message 106A has been transmitted to the mailbox provider 112A and the email message 106B has been transmitted to the mailbox provider 112B.

Each mailbox provider 112A-112B may provide an email inbox to each recipient through a recipient device 114A-114B that can retrieve the transmitted email messages 106. For example, in the embodiment shown in FIG. 1, the recipient device 114A is utilized to obtain the email message 106A from an inbox provided by the mailbox provider 112A. Similarly, the recipient device 114B is utilized to obtain the email message 106B from an inbox provided by the mailbox provider 112B. The recipient devices 114A-114B might also be an application server 109 in the ESP system 102, a remote server computer, a PC, a laptop, tablet device, a notebook computer, a PDA, a wireless device, a wireless telephone, an electronic-book reader, a game console, a set-top box, a consumer electronics device, or any other computing device capable of connecting to a mailbox provider 112 and receiving email messages 106.

As also described briefly above, the mailbox providers 112 might incorporate a variety of anti-spam techniques to protect recipients from UBE. As part of the implemented anti-spam techniques, upon detecting a threshold number of email messages 106 identified as spam email, a mailbox provider 112 may begin to mark all email messages 106 from the sending mail server (e.g. the email delivery module 110) as spam email based on the IP address from which the email message 106 was transmitted. The mailbox providers 112 might also take other types of actions, such as slowing down the delivery of email messages 106, in response to detecting a high volume of spam email or customer complaints.

Ultimately, a mailbox provider 112 may begin to block all email messages 106 transmitted from a mail server using a particular IP address. In addition, the mailbox provider 112 may share the IP address of the offending mail server with other remote mail systems through the use of a "blacklist." Consequently, email messages 106 transmitted using a blacklisted IP address may be blocked by multiple mailbox providers 112A-112B. This, of course, can be very frustrating for senders of email messages 106, especially those senders that were not responsible for the blocking of email messages 106 by the mailbox providers 112.

In order to address the considerations set forth above, and potentially others, the ESP system 102 is configured with technologies for predicting message deliverability events and for, potentially, addressing conditions contributing to the probability of such an event before the event occurs. As defined above, a message deliverability event is an event initiated by a mailbox provider 112 that results in the refusal of the mailbox provider 112 to deliver a message to the inbox of its intended recipient, or that results in a mailbox provider 112 delaying the delivery of a message to the inbox of its intended recipient. For example, and without limitation, a mailbox provider 112 might initially slow down the delivery of messages to inboxes. The mailbox provider 112 might subsequently mark incoming mail as SPAM. Ultimately, the mailbox provider 112 might reject incoming messages. The mailbox provider 112 might also take other types of actions during a message deliverability event that result in the delayed delivery of messages or the failure of messages to be delivered to their intended recipient.

Utilizing the technologies described herein, the ESP system 102 can be configured to monitor aspects of the transmission of email messages 106 to the mailbox providers 112 and the responses to the transmission of the email messages 106 received back from the mailbox providers 112. Based upon the monitoring, the ESP system 102 can determine the probability of a future message deliverability event with regard to one or more of the mailbox providers 112. If the computed probability of a message deliverability event exceeds a threshold value, the ESP system 102 can then initiate one or more actions designed to reduce the probability that the future message delivery event will occur. It should be appreciated that threshold value may be specified by an administrator or operator of the ESP system 102. The threshold value might also be determined by the ESP system 102 itself. For example, and without limitation, the threshold value might be computed using statistical analysis. The threshold value might also be computed in other ways. The threshold value might also be provided by another system or component.

In order to implement some or all of the functionality described above, a deliverability event prediction module 118 is executed on the application servers 109 in conjunction with the email delivery module 110 in one embodiment. The deliverability event prediction module 118 operates in conjunction with the email delivery module 110 to monitor the transmission of email messages 106 to the mailbox providers 112. In this regard, the deliverability event prediction module 118 is configured to collect message status information regarding the transmission of the email messages 106 to the mailbox providers 112 over time.

For example, and without limitation, the message status information might include return codes 116A-116B provided by the mailbox providers 112A-112B, respectively, in response to the transmission of the email messages 106A-106B, data describing the timing of messages received back from the mailbox providers 112A-112B, the plain text content of messages received from the mailbox providers 112A-112B, and other information. The return codes 116 may be SMTP reply codes or other types of codes returned by mailbox providers 112 in response to receiving an email message from a sender. The return codes 116 might indicate, for example, that a message was rejected but the message may be accepted at a future time (a "soft bounce"), that a message was rejected and the message will not be accepted at a future time (a "hard bounce"), that transmission is occurring too fast, and other types of result messages.

The deliverability event prediction module 118 might also be configured to periodically analyze the collected message status information to determine the probability of the occurrence of a future message deliverability event with regard to one or more of the mailbox providers 112. For example, and without limitation, the deliverability event prediction module 118 might analyze patterns in the collected message status information to compute the probability of a future message deliverability event with regard to a particular mailbox provider 112.

For example, and without limitation, the deliverability event prediction module 118 might analyze the collected message status information and determine that a large number of soft bounces during a particular period of time is highly indicative of a future message deliverability event. As another example, the deliverability event prediction module 118 might determine that a message deliverability event is likely based upon the speed at which a mailbox provider 112 provides responses to transmitted email messages 106. For example, a mailbox provider 112 that slows down the pace of communication with the email delivery module 110 may be indicative of a future message deliverability event on the part of the particular mailbox provider 112. Other types of patterns over time might be detected in the collected message status information and utilized to compute the probability of a future message deliverability event. Various types of analyses might be performed on the collected message status information to perform such a computation including, but not limited to, machine learning and other types of statistical analyses.

If the deliverability event prediction module 118 determines that the probability of a future message deliverability event exceeds a specified threshold, the deliverability event prediction module 118 might also cause one or more actions to be taken to reduce the probability that the predicted deliverability event will occur. For example, and without limitation, the deliverability event prediction module 118 might modify one or more IP addresses and/or domains utilized to send email messages 106 to a mailbox provider 112 for which a message deliverability event is likely, might disable certain IP addresses for sending email messages 106, or initiate mitigation action via an interface exposed by the mailbox provider 112.

The deliverability event prediction module 118 might also initiate an investigation into the cause, or causes, of the predicted message deliverability event. For example, and without limitation, the deliverability event prediction module 118 might identify one or more email senders that are at least partially responsible for the predicted message deliverability event. The deliverability event prediction module 118 might also provide suggestions to the identified message senders regarding ways in which the senders may reduce the probability of the occurrence of the predicted message deliverability event. For example, the deliverability event prediction module 118 might suggest changes to the content of the email messages 106 transmitted by the senders that may reduce the likelihood that a mailbox provider 112 would classify the email messages 106 as UBE. The deliverability event prediction module 118 might also initiate other types of actions to reduce the likelihood of the predicted message deliverability event occurring.

In some embodiments, the deliverability event prediction module 118 also computes a value, or values, that describe the impact that the predicted message deliverability event would have should the event occur. For example, and without limitation, this value might quantify the number of impacted senders, IP addresses, or domains should the predicted message deliverability event occur. In this embodiment, the deliverability event prediction module 118 might take one or more of the actions described above if the probability of a deliverability event exceeds a certain threshold and if the value describing the impact of the potential event also exceeds a threshold specified by the ESP. In this way, for example, no action might be taken with regard to a message deliverability event that has a very low impact event though the probability of the event is very high. Other factors might also be taken into account when determining whether the take one or more of the actions described above.

In some embodiments, the ESP system 102 is also configured to maintain sender reputation scores 122 for each of the senders that utilize the ESP system 102 to send email messages 106. A sender reputation score 122 provides an indication of the reputation of a sender in regard to the character and quality of the email activity of the sender. A sender reputation computation module 120 executing within the ESP system 102 might compute the sender reputation score 122 of a particular sender based upon cumulative data regarding the sender's email activity, including content scores calculated for email messages 106 sent by the sender, complaints received by recipients of email messages 106 sent by the sender, such as "Mark as Spam" operations in the recipients' email client applications, email messages 106 sent by the sender that are returned as undeliverable, and the like.

In some embodiments, the deliverability event prediction module 118 might also utilize the predicted probability of the future message deliverability event to modify the sender reputation scores 122 computed by the sender reputation computation module 120 and associated with message senders. The deliverability event prediction module 118 might also utilize the predicted probability of the future message deliverability event for other purposes in other embodiments. Additional details regarding the operation of the deliverability event prediction module 118 will be provided below with regard to FIGS. 2 and 3.

Figure 2:
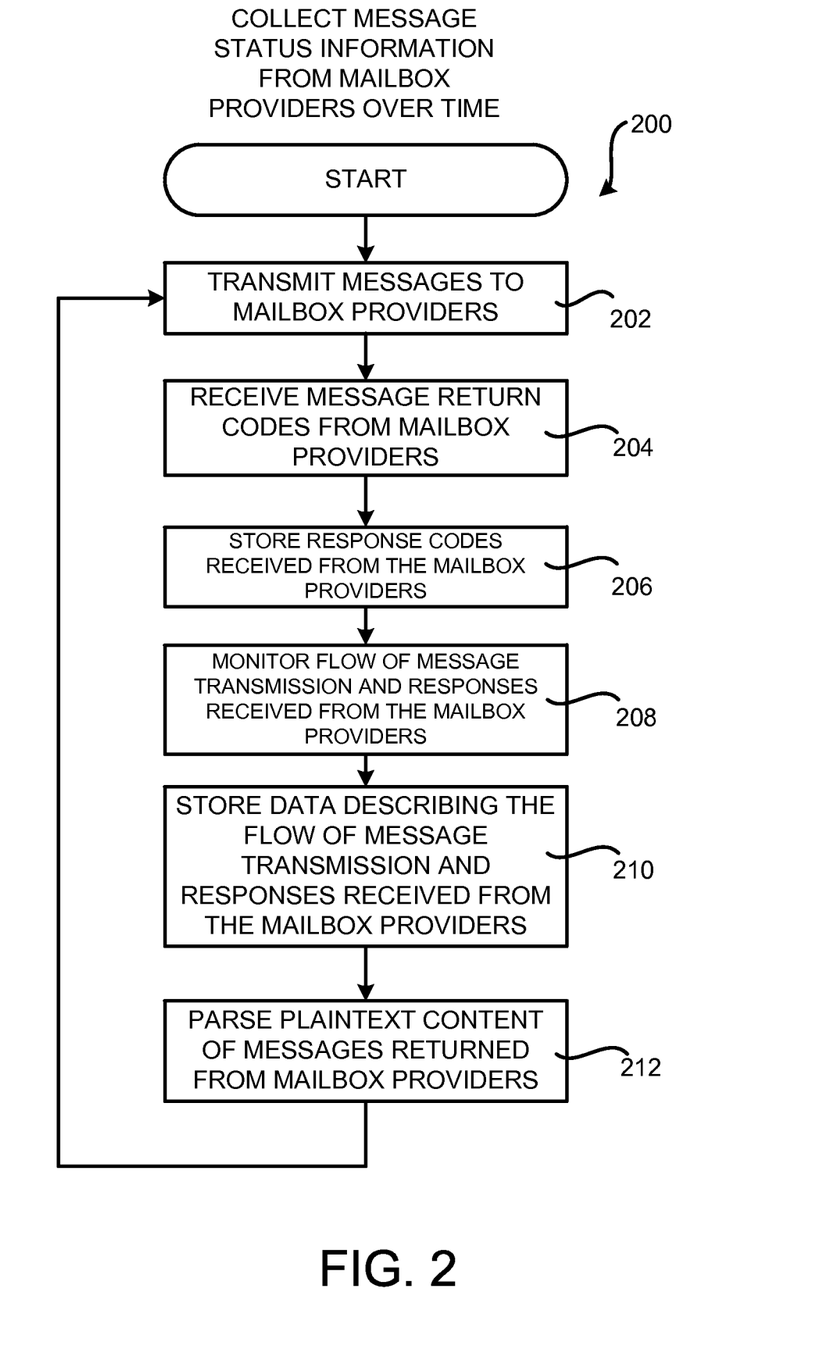
FIG. 2 is a flow diagram showing aspects of one illustrative routine disclosed herein for collecting message status information from mailbox providers over a period of time, according to embodiments described herein.

FIG. 2 is a flow diagram showing aspects of one illustrative routine 200 disclosed herein for collecting message status information from mailbox providers 112 over a period of time, according to embodiments described herein. The deliverability event prediction module 118 performs the routine 200 in one embodiment. It should be appreciated, however, that the email delivery module 110 might also perform the operations shown in the routine 200 in other embodiments. Other modules or components, or a combination of modules and/or components, might also perform the operations of the routine 200 in other embodiments.

The routine 200 begins at operation 202, where the email delivery module 110 sends email messages 106 to the mailbox providers 112 in the manner described above. From operation 202, the routine 200 proceeds to operation 204, where the email delivery module 110 receives return codes 116 from the mailbox providers 112 in response to the transmission of the email messages 106. The email delivery module 110 may provide the return codes 116 to the deliverability event prediction module 118. The deliverability event prediction module 118 may then store the return codes 116 in an appropriate data store at operation 206. As will be described below, the deliverability event prediction module 118 may analyze the stored return codes 116 and other data to determine the probability of a future message deliverability event.

From operation 206, the routine 200 proceeds to operation 208, where the email delivery module 110, or the deliverability event prediction module 118, monitors the flow and timing of messages transmitted to the mailbox providers 112 and messages received from the mailbox providers 112. For example, the email delivery module 110 might maintain data describing the timing of the transmission of the email messages 106 and the responses received from the mailbox providers 112. Data describing the timing of message transmission and receipt may then be stored at operation 210. As will be described below, the deliverability event prediction module 118 might also analyze the stored timing information to determine the probability of a future message deliverability event.

Additionally, and as mentioned briefly above, the deliverability event prediction module 118 might also parse the plain text of messages received from the mailbox providers 112 in an attempt to locate information that might be indicative of a future message deliverability event. This occurs at operation 212.

From operation 212, the routine 200 proceeds back to operation 202, where additional message status information might be collected and stored in the manner described above. In this way, message status information regarding the transmission of messages to, and receipt of messages from, the mailbox providers 112 can be captured over some period of time. As will be described below with regard to FIG. 3, this collected data may then be analyzed to determine the probability of a future message deliverability event.

Figure 3:
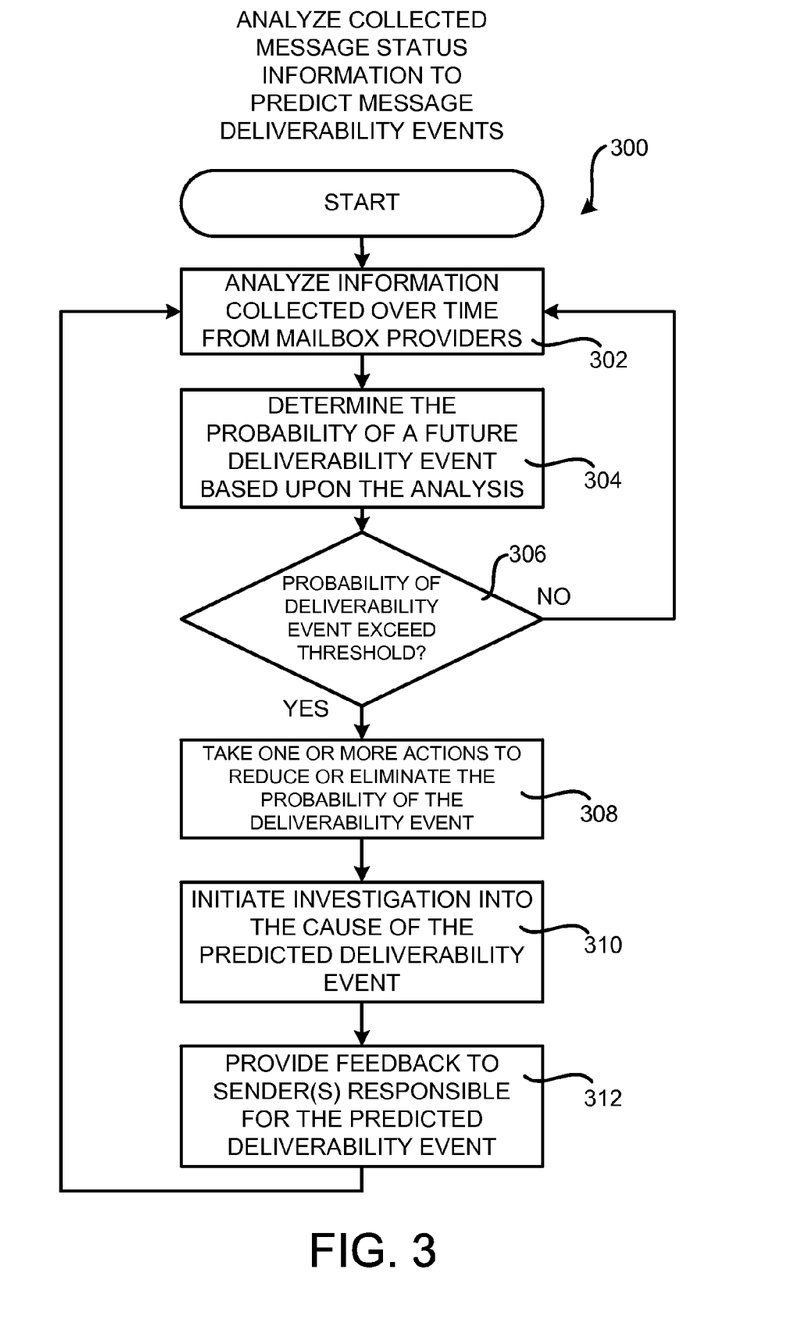
FIG. 3 is a flow diagram showing aspects of one illustrative routine disclosed herein for analyzing collected message status information to predict future message deliverability events and, potentially, to reduce or eliminate the probability of a future message deliverability event, according to embodiments described herein.

FIG. 3 is a flow diagram showing aspects of one illustrative routine 300 disclosed herein for analyzing collected message status information to predict future message deliverability events and, potentially, to reduce the probability of a future message deliverability event, according to embodiments described herein. As with the routine 200 described above, the deliverability event prediction module 118, the email delivery module 110, or other modules or combinations of modules and/or components may perform the various operations described below with regard to the routine 300.

The routine 300 begins at operation 302, where the deliverability event prediction module 118 analyzes the message status information collected from the mailbox providers 112 in the manner described above with regard to FIG. 2. As mentioned above, various machine learning, statistical, and other types of analyses may be performed on the message status information in order to compute the probability of a future message deliverability event with respect to one or more of the mailbox providers 112. At operation 304, the deliverability event prediction module 118 then computes the probability of a future message deliverability event based upon the analysis performed at operation 302.

From operation 304, the routine 300 proceeds to operation 306, where the deliverability event prediction module 118 determines whether the computed probability of a future message deliverability event exceeds a certain threshold. If the probability of a future message deliverability event exceeds the threshold, the routine 300 proceeds back to operation 302, where additional message status information may be collected and analyzed in the manner described above. If, however, the probability of a future message deliverability event exceeds the threshold, the routine 300 proceeds from operation 306 to operation 308.

At operation 308, the deliverability event prediction module 118 initiates one or more actions in order to reduce or eliminate the probability that the predicted deliverability event will occur. As discussed above, for example, the deliverability event prediction module 118 might modify one or more IP addresses and/or domain names utilized to send email messages 106 to a mailbox provider 112 for which a message deliverability event is likely, might disable certain IP addresses for sending email messages 106, or initiate mitigation action via an interface exposed by the mailbox provider 112.

From operation 308, the routine 300 proceeds to operation 310, where the deliverability event prediction module 118 might also initiate an investigation into the cause, or causes, of the predicted message deliverability event. As discussed above, for example, the deliverability event prediction module 118 might identify one or more email senders that are at least partially responsible for the predicted message deliverability event. The deliverability event prediction module 118 might also transmit a message or other indicator to an administrator instructing the administrator to begin an investigation into the cause, or causes, of the predicted message deliverability event.

At operation 312, the deliverability event prediction module 118 might also provide feedback to the senders identified at operation 310 as being responsible for the potential message deliverability event. For example, suggestions might be provided to the identified message senders regarding ways in which the senders may reduce the probability of the occurrence of the predicted message deliverability event. The deliverability event prediction module 118 might also initiate other types of actions to reduce the likelihood of the predicted message deliverability event occurring.

From operation 312, the routine 300 proceeds back to operation 302, where the process described above may be repeated in order to continually analyze the message status information to identify and, potentially, address future message deliverability events.

Figure 4:
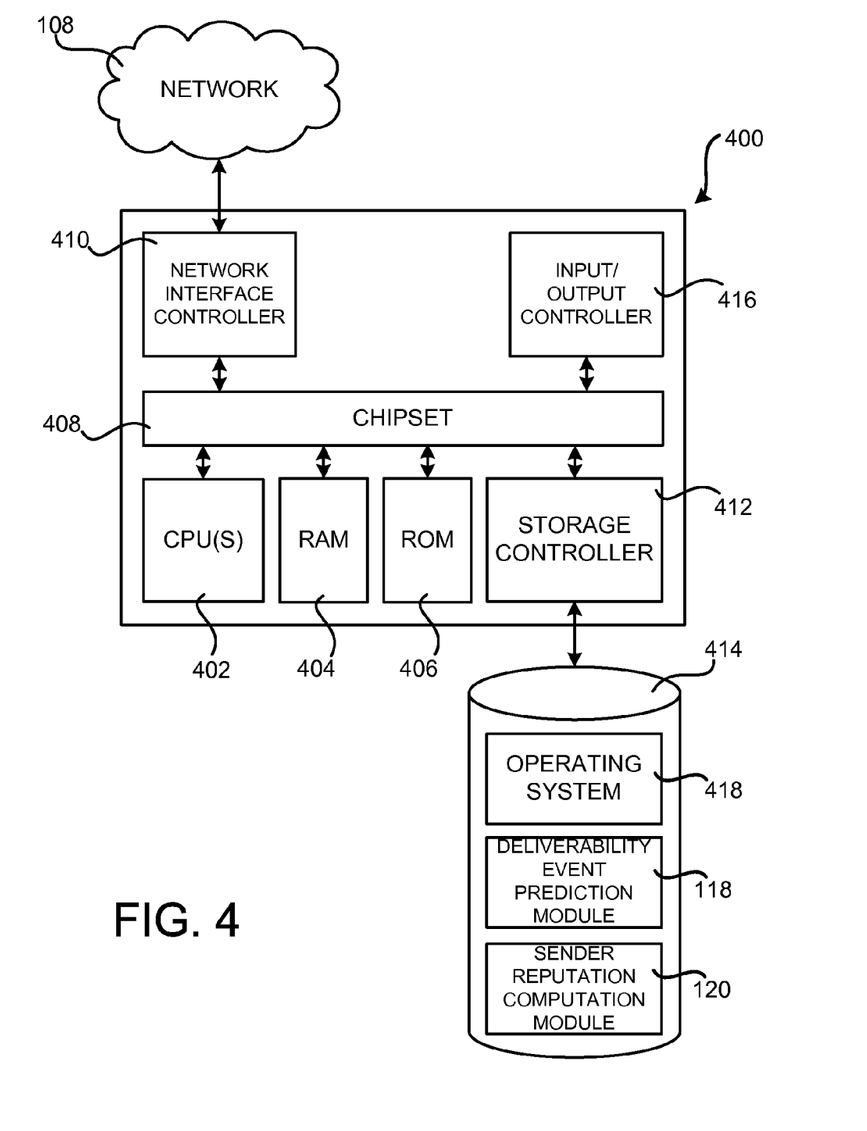
FIG. 4 is a computer architecture diagram showing an illustrative computer hardware architecture for computing devices described in embodiments presented herein.

FIG. 4 shows an example computer architecture for a computer 400 capable of executing the software components described herein for predicting and resolving message deliverability events, in the manner presented above. The computer architecture shown in FIG. 4 illustrates a conventional server computer, workstation, desktop computer, laptop, network appliance, personal digital assistant ("PDA"), electronic book reader, digital cellular phone, or other computing device, and may be utilized to execute any aspects of the software components presented herein described as executing on the application servers 109, sending devices 104, recipient devices 114, or other computing platform.

The computer 400 includes a baseboard, or "motherboard," which is a printed circuit board to which a multitude of components or devices may be connected by way of a system bus or other electrical communication paths. In one illustrative embodiment, one or more central processing units ("CPUs") 402 operate in conjunction with a chipset 408. The CPUs 402 are standard programmable processors that perform arithmetic and logical operations necessary for the operation of the computer 400.

The CPUs 402 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 408 provides an interface between the CPUs 402 and the remainder of the components and devices on the baseboard. The chipset 408 may provide an interface to a random access memory ("RAM") 404, used as the main memory in the computer 400. The chipset 408 may further provide an interface to a computer-readable storage medium such as a read-only memory ("ROM") 406 or non-volatile RAM ("NVRAM") for storing basic routines that help to startup the computer 400 and to transfer information between the various components and devices. The ROM 406 or NVRAM may also store other software components necessary for the operation of the computer 400 in accordance with the embodiments described herein.

According to various embodiments, the computer 400 may operate in a networked environment using logical connections to remote computing devices and computer systems through the network 108, such as a local-area network ("LAN"), a wide-area network ("WAN"), the Internet, or any other networking topology known in the art that connects the computer 400 to remote computers. The chipset 408 includes functionality for providing network connectivity through a network interface controller ("NIC") 410, such as a gigabit Ethernet adapter. The NIC 410 is capable of connecting the computer 400 to other computing devices over the network 108, such as the application servers 109, the sending computer devices 104, a data storage system in the ESP system 102, and the like. It should be appreciated that any number of NICs 410 may be present in the computer 400, connecting the computer 400 to other types of networks and remote computer systems.

The computer 400 may be connected to a mass storage device 414 that provides non-volatile storage for the computer 400. The mass storage device 414 may store system programs, application programs, other program modules, and data, which are described in greater detail herein. The mass storage device 414 may be connected to the computer 400 through a storage controller 412 connected to the chipset 408. The mass storage device 414 may consist of one or more physical storage units. The storage controller 412 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 400 may store data on the mass storage device 414 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 414 is characterized as primary or secondary storage, and the like. For example, the computer 400 may store information to the mass storage device 414 by issuing instructions through the storage controller 412 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 400 may further read information from the mass storage device 414 by detecting the physical states or characteristics of one or more particular locations within the physical storage units.

In addition to the mass storage device 414 described above, the computer 400 may have access to other computer-readable storage media to store and retrieve information, such as program modules, data structures, or other data. It should be appreciated by those skilled in the art that computer-readable storage media can be any available non-transitory media that may be accessed by the computer 400. By way of example, and not limitation, computer-readable storage media may include volatile and non-volatile, removable and non-removable media implemented in any method or technology. Computer-readable storage media includes RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 414 may store an operating system 418 utilized to control the operation of the computer 400. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The mass storage device 414 may store other system or application programs and data utilized by the computer 400, such as the sender reputation computation module 120 and the deliverability event prediction module 118, each of which was described above in regard to FIGS. 1-3. In one embodiment, the mass storage device 414 or other computer-readable storage media may be encoded with computer-executable instructions that, when loaded into the computer 400, may transform the computer from a general-purpose computing system into a special-purpose computer capable of implementing the embodiments described herein. These computer-executable instructions transform the computer 400 by specifying how the CPUs 402 transition between states, as described above. According to one embodiment, the computer 400 may have access to computer-readable storage media storing computer-executable instructions that, when executed by the computer, perform the routines 200 and 300 described above with regard to FIGS. 2 and 3, respectively.

The computer 400 might also include an input/output controller 416 for receiving and processing input from a number of input devices, such as a keyboard, the mouse, a touchpad, a touch screen, an electronic stylus, or other type of input device. Similarly, the input/output controller 416 may provide output to a display, such as a computer monitor, a flat-panel display, a digital projector, a printer, a plotter, or other type of output device. It will be appreciated that the computer 400 may not include all of the components shown in FIG. 4, may include other components that are not explicitly shown in FIG. 4, or may utilize an architecture completely different than that shown in FIG. 4.

Based on the foregoing, it should be appreciated that concepts and technologies for predicting, and potentially resolving, message deliverability events have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A system for predicting and resolving message deliverability events, the system comprising:
   one or more application servers;
   an email delivery module executing on the application servers and configured to receive outbound email messages and to transmit the email messages to mailbox providers for delivery of the email messages to intended recipients; and
   a deliverability event prediction module executing on the application servers and configured to operate in conjunction with the email delivery module to
      collect message status information regarding the transmission of the email messages to the mailbox providers over time,
      analyze the collected message status information to determine a probability of a future message deliverability event with regard to one or more of the mailbox providers,
      determine an impact of the future message deliverability event,
      determine if the probability of a future message deliverability event with regard to one or more of the mailbox providers exceeds a first threshold,
      determine if the impact of the future message deliverability event exceeds a second threshold, and
      cause one or more actions to be taken to reduce the probability of the future message deliverability event in response to determining that the probability of a future message deliverability event exceeds the first threshold and the impact of the future message deliverability event exceeds the second threshold.

2. The system of claim 1, wherein the message status information comprises return codes provided by the mailbox providers.

3. The system of claim 1, wherein the message status information comprises data describing a timing of messages received from the mailbox providers.

4. The system of claim 1, wherein the message status information comprises text content of messages received from the mailbox providers.

5. The system of claim 1, wherein the message deliverability event comprises a refusal by one or more of the mailbox providers to deliver email messages transmitted by the email delivery module to the intended recipients.

6. The system of claim 1, wherein the deliverability event prediction module is further configured to initiate an investigation into the future message deliverability event in response to determining that the probability of a future message deliverability event with regard to one or more of the mailbox providers exceeds the first threshold.

7. The system of claim 1, wherein the deliverability event prediction module is further configured to:
identify one or more message senders at least partially responsible for the future message deliverability event; and
provide feedback to the one or more message senders identifying one or more ways in which the senders can reduce the probability of the future message deliverability event.

8. A computer-readable storage medium having computer-executable instructions stored thereon which, when executed by a computer, cause the computer to:
collect message status information from the transmission of messages to one or more mailbox providers over a period of time;
analyze the collected message status information to determine a probability of a future message deliverability event with regard to one or more of the mailbox providers;
determine if the probability of a future message deliverability event exceeds a threshold with regard to one or more of the mailbox providers; and
in response to determining that the probability of a future message deliverability event exceeds the threshold with regard to one or more of the mailbox providers, to initiate one or more actions to reduce the probability of the future message deliverability event.

9. The computer-readable storage medium of claim 8, wherein the messages comprise electronic mail (email) messages sent from an email service provider system to the mailbox providers and wherein the mailbox providers provide email inboxes.

10. The computer-readable storage medium of claim 9, wherein the message status information comprises return codes provided by the mailbox providers.

11. The computer-readable storage medium of claim 9, wherein the message status information comprises data describing a timing of messages received from the mailbox providers.

12. The computer-readable storage medium of claim 9, wherein the message status information comprises text content of messages received from the mailbox providers.

13. The computer-readable storage medium of claim 9, having further computer-executable instructions stored thereon which, when executed by the computer, cause the computer to initiate an investigation into the future message deliverability event in response to determining that the probability of the future message deliverability event exceeds the threshold with regard to one or more of the mailbox providers.

14. The computer-readable storage medium of claim 9, having further computer-executable instructions stored thereon which, when executed by the computer, cause the computer to:
identify one or more message senders at least partially responsible for the future message deliverability event; and
provide feedback to the one or more message senders identifying one or more ways in which the senders can reduce the probability of the future message deliverability event.

15. The computer-readable storage medium of claim 14, having further computer-executable instructions stored thereon which, when executed by the computer, cause the computer to modify a sender reputation score associated with the one or more message senders based upon the computed probability of a future message deliverability event.

16. A computer-implemented method for predicting a message deliverability event comprising:
collecting message status information during the transmission of messages to one or more mailbox providers over time;
analyzing the collected message status information to determine a probability of a future message deliverability event with regard to one or more of the mailbox providers;
determining, based at least in part upon the analyzing, that the probability of a future message deliverability event exceeds a threshold with regard to one or more of the mailbox providers; and
at least partly in response to determining that the probability of the future message deliverability event exceeds the threshold with regard to one or more of the mailbox providers, initiating one or more actions to reduce the probability of the future message deliverability event.

17. The computer-implemented method of claim 16, wherein the message status information comprises one or more of return codes provided by the mailbox providers, data describing a timing of messages received from the mailbox providers, and text content of messages received from the mailbox providers.

18. The computer-implemented method of claim 16, further comprising: identifying one or more message senders at least partially responsible for the future message deliverability event; and providing feedback to the one or more message senders identifying one or more ways in which the senders can reduce the probability of the future message deliverability event.

19. The computer-implemented method of claim 18, further comprising modifying a sender reputation score associated with the one or more message senders based upon the computed probability of a future message deliverability event.

20. The computer-implemented method of claim 19, wherein the messages comprise electronic mail (email) messages sent from an email service provider system to the mailbox providers.

* * * * *